Aug. 17, 1954    A. KALITINSKY    2,686,657
DIAPHRAGM SEAL FOR TURBINES
Filed Aug. 2, 1947
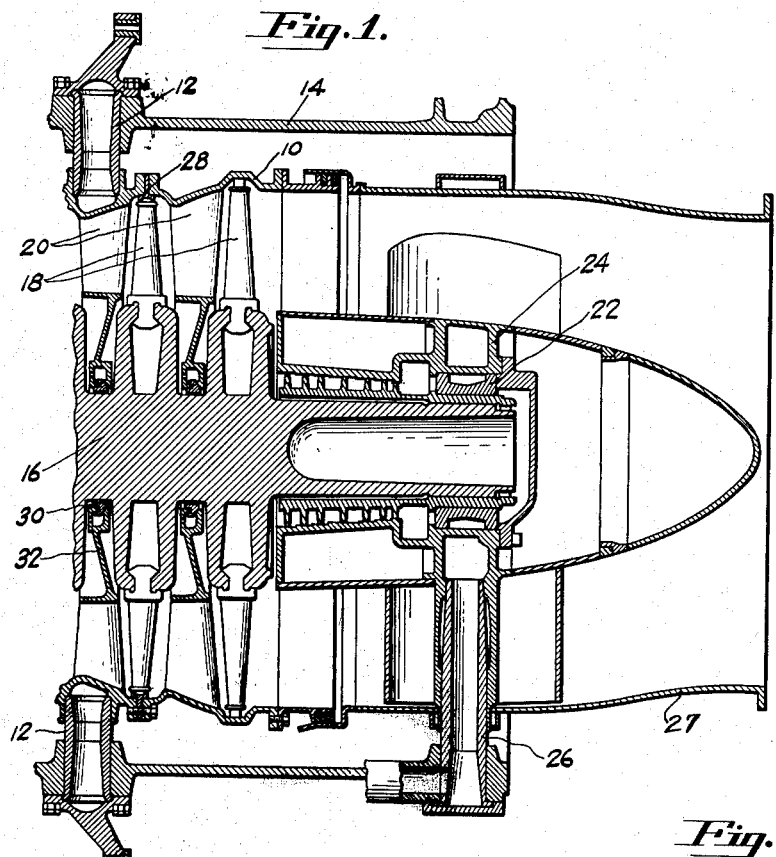
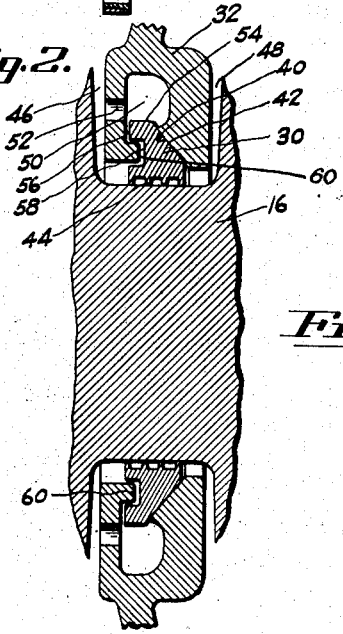
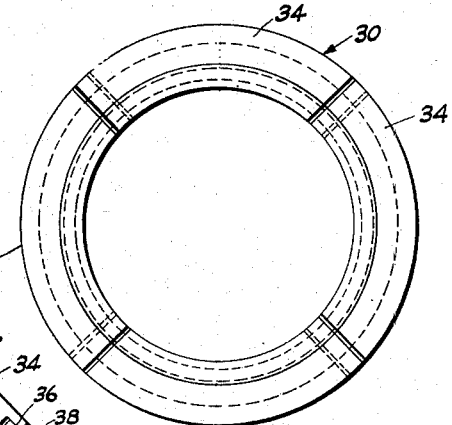
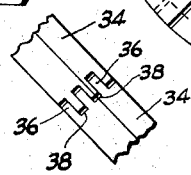
INVENTOR
*Andrew Kalitinsky*
BY
*Charles A. Warren*
ATTORNEY Patented Aug. 17, 1954

2,686,657

UNITED STATES PATENT OFFICE 2,686,657

DIAPHRAGM SEAL FOR TURBINES

Andrew Kalitinsky, Oak Ridge, Tenn., assignor to United Aircraft Corporation, East Hartford, Conn., a corporation of Delaware Application August 2, 1947, Serial No. 765,793

2 Claims. (Cl. 253—78)

This invention relates to a seal for a turbine particularly adapted for a diaphragm seal for high temperature turbines.

In turbines operating at high temperatures, the seals, if designed to have the desired clearance at operating temperatures, frequently seize on the rotor when the turbine is shut down by reason of the differential contraction resulting from the more rapid cooling of the turbine casing. This seizing may be sufficient to damage the seal and may frequently prevent restarting of the turbine until the rotor has cooled substantially to the same temperature as the surrounding casing. In many instances the cooling of the rotor may take several hours by reason of its complete enclosure within the casing. A feature of this invention is a seal which may move away from the rotor when the turbine is not operating and which is moved into and held in operative relation to the rotor by the pressure differential existing across the seal when the turbine is operating.

A feature of the invention is a pressure controlled sealing ring in which a part of the ring is acted upon directly by the pressure fluid. Another feature is an arrangement for limiting the movement of the sealing ring to establish the operative position of the seal.

Other objects and advantages will be apparent from the specification and claims, and from the accompanying drawing which illustrates an embodiment of the invention.

Fig. 1 is a longitudinal sectional view through a part of the turbine. Fig. 2 is a fragmentary sectional view on a larger scale showing the turbine seal. Fig. 3 is an elevation of the segmental sealing ring. Fig. 4 is a fragmentary view of one of the joints in the sealing ring.

The turbine shown includes a casing 10, which may be built up of a number of rings as shown, and is supported by radial pins 12 within housing 14. The rotor 16 has rows of blades 18 alternating with the rows of nozzles 20 in the casing. The rotor is supported at one end by a bearing 22 in a spider 24 which is mounted within the outer housing 14 by a row of radially extending pins 26. The pins 26 may also support the exhaust duct 27.

Leakage of fluid past the outer end rows of blades may be prevented by seals 28 closely spaced from the tips of the blades and leakage of fluid past the rows of nozzles is prevented by seals 30 carried by inwardly extending diaphragms 32 carried by the nozzle rings. The seals 30 are located between successive rows of blades and are intended to engage with or to be closely spaced from the rotor as shown for example in the enlarged view of Fig. 2.

The seal 30 is in the form of a ring, Fig. 3, which is made up of segments 34, the interengaging ends of which have overlapping tongues 36 fitting in cooperating grooves 38 thereby to prevent leakage of the power fluid past the seal.

The sealing ring 30 has an external conical surface 40 engaging with a similarly shaped internal surface 42 on the inner edge of the diaphragm 32, the apex of the conical surfaces pointing in a downstream direction. In this way, movement of the seal 30 toward the right, Fig. 2, will cause the segments of the ring to move together thereby causing the sealing fins 44 which are carried by the inner surface of the seal to move inwardly toward the surface of the rotor with which they cooperate.

It will be apparent that a pressure differential exists across each row of nozzles, there being a higher pressure on the inlet side (space 46) of each row of nozzles than on the discharge or downstream side thereof (space 48). The diaphragm has an annular recess 50, for which the outer surface of the seal forms one wall, and this recess communicates with the space 46 by ports 52. The seal 30 is thus exposed at its outer surface 54 to the pressure on the upstream side of the diaphragm and the side surface 56 on the upstream side of the seal is also exposed to this pressure. It may be noted that this surface 56 may have a notch 58 therein engaging loosely with a projecting flange 60 on the diaphragm to control to some extent the movement of the seal. When the turbine is operating, the high pressure acting on the side surface 56 of the seal will move it to the right against the conical seat thereby causing the ring segments to move radially inward against the rotor. The inward movement of the seal may be limited by controlling the length of the tongues 36 and the depth of the cooperating grooves 38 so that the tongues bottom in the grooves when the sealing fins 44 have reached the desired operative relation to the rotor.

When the turbine is shut down, the pressure differential across the seal no longer exists and the seal elements are then free to move radially outward along the conical surface 42 to prevent damage to the sealing fins 44 and also to prevent the rotor from being so tightly engaged by the fins 44 as to prevent the rotor from being set in motion again. Thus the turbine may be started and stopped as desired without the necessity for waiting until the turbine rotor can have cooled enough to free the rotor from the clamping action of the conventional type of seals.

It is to be understood that the invention is not limited to the specific embodiment herein illustrated and described, but may be used in other ways without departure from its spirit as defined by the following claims.

I claim:

1. A turbine including a rotor having a row of blades, a diaphragm having a row of nozzles adjacent to the row of blades, a sealing means carried by said diaphragm and surrounding a part of said rotor, said sealing means including a split ring having overlapping ends, said diaphragm having an internal substantially conical surface thereon facing toward the high pressure side of the diaphragm, and said split ring having a cooperating external conical surface thereon with its apex pointing in a downstream direction, said ring and diaphragm being so constructed and arranged that the upstream end of said ring is exposed to the pressure on the upstream side of said diaphragm and said ring also having an outer peripheral surface exposed to the pressure on the high-pressure upstream side of the diaphragm.

2. A turbine including a rotor having a row of blades, a diaphragm having a row of nozzles adjacent to the row of blades, a sealing means carried by said diaphragm and surrounding a part of said rotor, said sealing means including a split ring having overlapping ends, said diaphragm having an internal substantially conical surface thereon facing toward the high pressure side of the diaphragm, and said split ring having a cooperating external conical surface thereon with its apex pointing in a downstream direction, said ring and diaphragm being so constructed and arranged that the upstream end of said ring is exposed to the pressure on the upstream side of said diaphragm and said ring also having an outer peripheral surface exposed to the pressure on the high-pressure upstream side of the diaphragm whereby the pressure acting on the ring will move the latter with respect to the diaphragm to cause the cooperating conical surfaces to contract the ring and cooperating stop means on the diaphragm and ring to limit the contracting movement of said ring.

References Cited in the file of this patent

UNITED STATES PATENTS

| Number | Name | Date |
|---|---|---|
| Re. 8,411 | Prindle | Sept. 10, 1878 |
| 1,045,088 | Wriedt | Nov. 19, 1912 |
| 1,855,890 | Phillips | Apr. 26, 1932 |
| 2,008,520 | Soderberg | July 16, 1935 |